United States Patent
Lim et al.

(10) Patent No.: US 11,014,579 B2
(45) Date of Patent: May 25, 2021

(54) LANE DEPARTURE WARNING DETERMINATION METHOD USING DRIVER STATE MONITORING

(71) Applicant: A.I.MATICS Inc., Seoul (KR)

(72) Inventors: Sang Mook Lim, Seoul (KR); Kwang Il Park, Seongnam-si (KR); Jin Hyuck Kim, Seoul (KR)

(73) Assignee: A. I. MATICS INC., Seoul (KR)

( * ) Notice: Subject to any disclaimer, the term of this patent is extended or adjusted under 35 U.S.C. 154(b) by 0 days.

(21) Appl. No.: 16/905,505

(22) Filed: Jun. 18, 2020

(65) Prior Publication Data

US 2021/0001875 A1 Jan. 7, 2021

(30) Foreign Application Priority Data

Jul. 4, 2019 (KR) .......... 10-2019-0080531

(51) Int. Cl.
*B60W 50/14* (2020.01)
*G06K 9/00* (2006.01)
*B60W 40/08* (2012.01)

(52) U.S. Cl.
CPC .......... *B60W 50/14* (2013.01); *G06K 9/00798* (2013.01); *G06K 9/00845* (2013.01); *B60W 2040/0818* (2013.01); *B60W 2540/225* (2020.02); *B60W 2540/229* (2020.02)

(58) Field of Classification Search
CPC ........... B60W 50/14; B60W 2540/225; B60W 2540/229; B60W 2040/0818; G06K 9/00798; G06K 9/00845
See application file for complete search history.

(56) References Cited

U.S. PATENT DOCUMENTS

| 2014/0002656 A1* | 1/2014 | Woo ................... G06K 9/00798 348/148 |
| 2017/0148327 A1* | 5/2017 | Sim ......................... G08G 1/167 |
| 2019/0279009 A1* | 9/2019 | Srirangam Narashiman ............... G06T 7/248 |

FOREIGN PATENT DOCUMENTS

| KR | 10-0355993 B1 | 10/2002 |
| KR | 10-1018033 B1 | 3/2011 |
| KR | 10-1031846 B1 | 5/2011 |
| KR | 20110062651 A * | 6/2011 |
| KR | 10-1067437 B1 | 9/2011 |
| KR | 20120074820 A * | 7/2012 |
| KR | 10-1392850 B1 | 5/2014 |

* cited by examiner

*Primary Examiner* — Mohamed Barakat
(74) *Attorney, Agent, or Firm* — Rabin & Berdo, P.C.

(57) ABSTRACT

Disclosed is a lane departure warning determination method using driver state monitoring, which includes (a) recognizing a lane around a vehicle from an image photographed by a lane recognition camera and extracting lane information; (b) extracting facial feature points of a driver from an image photographed by a driver recognition camera; (c) determining from the lane information whether the vehicle is in a lane departure state or a lane approaching state; (d) when it is determined in step (c) that the vehicle is in the lane departure state, generating a warning when a face tilt of the driver exceeds a first angle; and (e) when it is determined in step (c) that the vehicle is in the lane approaching state, generating a warning when the face tilt of the driver exceeds a second angle.

13 Claims, 9 Drawing Sheets

LANE DEPARTURE WARNING DETERMINATION METHOD USING DRIVER STATE MONITORING

BACKGROUND

1. Technical Field

The present disclosure relates to a lane departure warning determination method using driver state monitoring, and more particularly, to a lane departure warning determination method using driver state monitoring, which enables safe driving by monitoring drowsy driving or the degree of front distraction of a driver and performing a lane departure warning or a lane approaching warning.

2. Related Art

An advanced driver assistance system (ADAS) is a technology in which a vehicle recognizes and determines by itself situations that may occur while the vehicle travels and controls a driving device, a vehicle-mounted device, and the like. The ADAS has been developed to assist and complement the driving of a driver in a complex vehicle control process and to ultimately establish the foundation of an autonomous driving technology.

As one of the ADASs, a lane departure warning system (LDWS) is a device that recognizes a lane by photographing front states or front states and surrounding roads by using cameras installed in a vehicle and sounds a warning when the vehicle departs from the lane. In the related art, many LDWSs have been developed in the direction of a lane recognition technology and a technology of determining lane departure.

Korean Patent No. 10-0355993 entitled "Lane Departure Warning Device and Method", Korean Patent No. 10-1018033 entitled "Lane Departure Warning Method and System", Korean Patent No. 10-1031846 entitled "Method for Detecting traffic Lane of Road Stub, System and Method for Warning Departure of traffic Lane using the same", Korean Patent No. 10-1067437 entitled "Lane Detection Method and Lane Departure Detection System Using the Same", Korean Patent No. 10-1392850 entitled "Image Recognition-based Lane Departure Detection Method and System", and the like disclose the above lane recognition and lane departure determination.

However, one of the problems of the lane departure warning system in the related art is a frequent warning. For example, when a driver intends to normally change a lane, the lane departure warning needs to be limited. This is because a warning contrary to the driver's intention may lower driving concentration.

Most automakers limit unnecessary warnings by allowing a lane departure warning to be generated only when a direction indicator does not operate. However, in many cases such as when there is no surrounding vehicle or when drivers have a driving habit of not operating a direction indicator, the direction indicator may not be operated along with driver's lane change intention.

In this regard, there is a need for enhanced methods of preventing unnecessary lane departure warnings.

[Patent Document 1] Korean Patent No. 0355993
[Patent Document 2] Korean Patent No. 1018033
[Patent Document 3] Korean Patent No. 1031846
[Patent Document 4] Korean Patent No. 1067437
[Patent Document 5] Korean Patent No. 1392850

SUMMARY

Various embodiments are directed to providing a lane departure warning determination method using driver state monitoring, in which a lane departure warning is generated by monitoring a driver's state regardless of an operation of a direction indicator, a lane departure state and a lane approaching state are separately detected, the degree of driver's forward looking is strictly determined to generate a warning in the event of lane departure, and the degree of the driver's forward looking is less strictly determined to generate a warning in the event of lane approaching, thereby preventing unnecessary warnings, generating an early warning in the event of negligence of forward looking, and ultimately enabling safe driving.

A lane departure warning determination method using driver state monitoring according to an embodiment of the present disclosure includes: (a) recognizing a lane around a vehicle from an image photographed by a lane recognition camera and extracting lane information; (b) extracting facial feature points of a driver from an image photographed by a driver recognition camera; (c) determining from the lane information whether the vehicle is in a lane departure state in which the vehicle has departed from the lane, a first lane proximity state in which the vehicle invades a first proximity line of a left edge of the lane or a right edge of the lane within a first predetermined distance, or a second lane proximity state in which the vehicle invades a second proximity line of the left edge of the lane or the right edge of the lane within a second predetermined distance; (d) when it is determined in step (c) that the vehicle is in the lane departure state, generating a warning when a face tilt of the driver exceeds a predetermined first angle centered on a front of the vehicle based on the facial feature points of the driver; and (e) when it is determined in step (c) that the vehicle is in the lane approaching state, generating a warning when the face tilt of the driver exceeds a second angle larger than the first angle centered on the front of the vehicle based on the facial feature points of the driver.

In the lane departure warning determination method using driver state monitoring according to another embodiment of the present disclosure, the facial feature points of the driver include position information of a face contour of the driver, position information of end points of each of both eyes located within the face contour, position information of a pupil located between the end points of each of both eyes, position information of a protruding start point and a protruding end point of a nose located within the face contour, and position information of upper and lower ends and left and right ends of lips located within the face contour.

In the lane departure warning determination method using driver state monitoring according to further another embodiment of the present disclosure, the face tilt of the driver is measured from a degree by which any one of the position information of the end points of each of both eyes, the position information of the pupil, the position information of the protruding start point and the protruding end point of the nose, and the position information of the upper and lower ends and the left and right ends of the lips has moved up, down, left, or right compared to a normal position centered on the front of the vehicle.

In the lane departure warning determination method using driver state monitoring according to further another embodiment of the present disclosure, the first angle is selected in a range of 13☐ to 17☐ and the second angle is selected in a range of 28☐ to 32☐.

The lane departure warning determination method using driver state monitoring according to further another embodiment of the present disclosure further includes: generating a warning when a drowsy driving state of the driver or an unrecognized state of the driver is determined based on the facial feature points of the driver in a case where it is determined in step (c) that the vehicle is in the lane departure state or the lane approaching state.

In the lane departure warning determination method using driver state monitoring according to further another embodiment of the present disclosure, the drowsy driving state is determined by determining whether a distance between the end points of each eye is increased from the position information of the end points of each eye, is determined by determining whether the position information of the pupil is not detected, or an interval between the upper and lower end positions of the lips is increased over a predetermined interval.

In the lane departure warning determination method using driver state monitoring according to further another embodiment of the present disclosure, the unrecognized state of the driver is determined when the position information of the face contour of the driver is changed to an allowable value or more.

In the lane departure warning determination method using driver state monitoring according to the present disclosure, the lane departure state and the lane approaching state are separately detected, the face tilt of a driver is measured using the facial feature points of the driver, a warning is generated when the face tilt exceeds the first angle in the lane departure state, and a warning is generated when the face tilt exceeds the second angle larger than the first angle in the lane approaching state, thereby preventing unnecessary warnings, generating an early warning in the event of negligence of forward looking, and enabling safe driving.

DETAILED DESCRIPTION

Hereinafter, specific embodiments according to the present disclosure will be described with reference to the accompanying drawings. However, the present disclosure is not intended to be limited to specific embodiments and should be construed to include all modifications, equivalents, and alternatives included in the spirit and scope of the present disclosure.

Elements having similar configurations and operations throughout the specification are denoted by the same reference numerals. The accompanying drawings of the present disclosure are for convenience of description and the shapes and relative scales may be exaggerated or omitted.

In describing the embodiments in detail, redundant descriptions or descriptions of technologies that are obvious in the art have been omitted. Furthermore, in the following description, when a part is referred to as "including" another component, it means that the part may further include components in addition to the described component unless otherwise stated.

Furthermore, a term such as " . . . unit", " . . . or (or . . . er)", and " . . . module" described in this specification means a unit for processing at least one function or operation, and this may be implemented with hardware, software, or a combination of the hardware and the software. Furthermore, when a part is referred to as being electrically connected to another part, it may indicate the part is directly connected to the another part or connected to the another part with another configuration interposed therebetween.

Terms including ordinal numbers such as first and second may be used to describe various components, but the components are not limited by the terms. The terms are used only to distinguish one component from another component. For example, a second component may be referred to as a first component and similarly, the first component may also be referred to as the second component without departing from the scope of the present disclosure.

A lane departure warning determination method using driver state monitoring according to the present disclosure determines whether to generate a warning according to driver's states, for example, a drowsy driving state, a driver's unrecognized state, and a driver's front distraction state, unlike the warning suppression method in the related art. Accordingly, even when a vehicle departs from a lane or approaches a lane without an operation of a direction indicator, it is possible to suppress a warning when a driver drives a vehicle with normal attention.

In addition, the lane departure warning determination method of the present disclosure determines whether to generate a warning based on different determination criteria according to a lane departure state and a lane approaching state. As will be described below in detail, in a state in which a vehicle has departed from a lane, the driver's front distraction state is determined based on strict criteria. In an embodiment, when a driver's face tilt exceeds a predetermined first angle (for example, an angle selected from 13☐ to 17☐), a warning is generated. In a state in which a vehicle approaches a lane, the driver's front distraction state is determined based on more relaxed criteria. In an embodiment, when the driver's face tilt exceeds a predetermined second angle (for example, an angle selected from 28☐ to 32☐) larger than the first angle, a warning is generated. Accordingly, it is possible to suppress unnecessary warnings and promptly warn a driver of a danger of lane departure due to the driver's front distraction.

Figure 1:
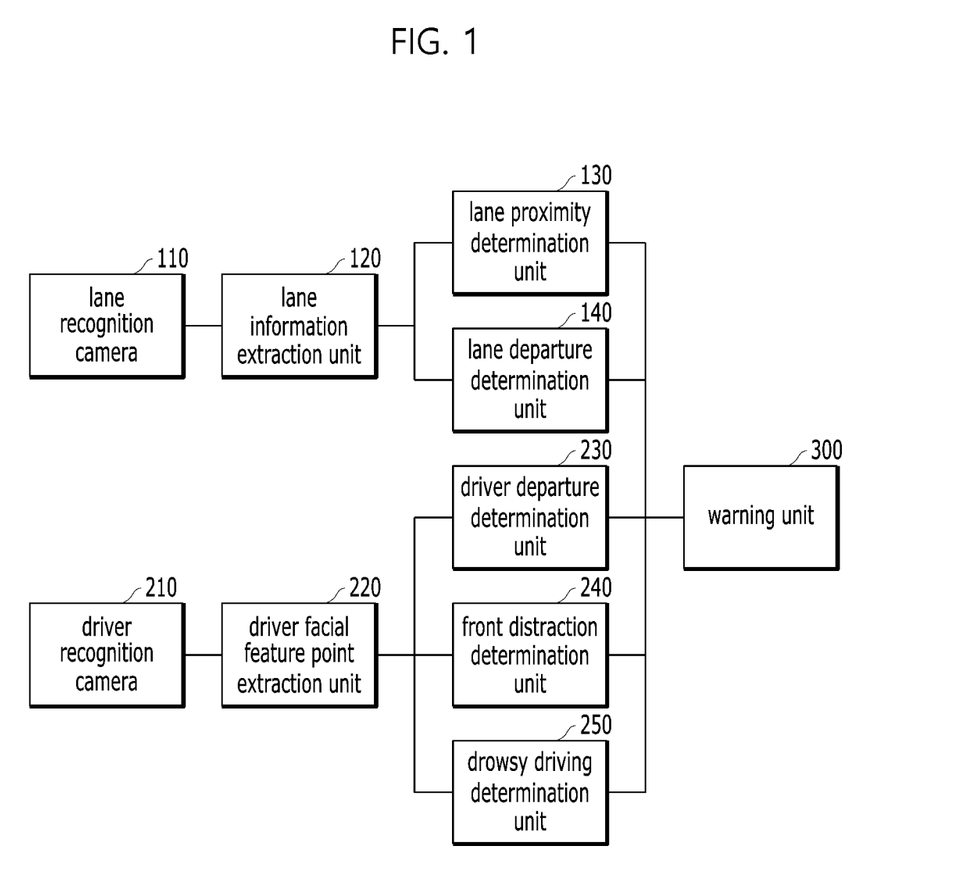
FIG. 1 is a block diagram illustrating a configuration of a device for implementing a lane departure warning determination method using driver state monitoring according to the present disclosure.

FIG. 1 is a block diagram illustrating a configuration of a device for implementing the lane departure warning determination method using driver state monitoring according to the present disclosure.

Referring to FIG. 1, in order to implement the lane departure warning determination method of the present disclosure, a vehicle is installed with a lane recognition camera 110 and a driver recognition camera 210, and is provided with a means that extracts lane information and determines lane proximity and departure, based on an image photographed by each camera and a means that extracts facial feature points of a driver and determines a lane departure state, a front distraction state, and a drowsy driving state of the driver, based on an image photographed by the driver recognition camera 210.

The lane recognition camera 110 includes a camera installed on a front portion of the vehicle. The camera installed on the front portion of the vehicle is a means that photographs the surface of a road on which the vehicle travels. In addition, the lane recognition camera 110 may further include cameras for monitoring the surroundings of the vehicle, for example, a side camera and a rear camera.

A lane information extraction unit 120 extracts information related to lanes from an image photographed by the lane recognition camera 110. For example, the lane information extraction unit 120 extracts edge components corresponding to the lanes and determines a lane candidate object from the extracted edge components. Then, the lane information extraction unit 120 converts the lane candidate object by Huff transformation and the like, performs filtering, and determines a final lane. Technologies related to the process in which the lane information extraction unit 120 extracts the lane information have been described well in the prior patents listed in the related art, and in implementing the lane departure warning determination method using driver state monitoring according to the present disclosure, the lane information extraction technology may use any of the publicly known technologies.

A lane proximity determination unit 130 is a means that determines the degree by which the vehicle approaches the lane. For example, the lane proximity determination unit 130 may calculate an accurate position of the lane by correcting GPS information of the vehicle and then determine proximity to the location of the lane. As another example, the lane proximity determination unit 130 may determine lane proximity by calculating a relative position of the vehicle to the lane based on image recognition.

A lane departure determination unit 140 is a means that determines whether the vehicle has departed from the lane. The lane departure determination unit 140 determines whether a left wheel of the vehicle has invaded a left edge of a lane or a right wheel of the vehicle has invaded a right edge of the lane. For example, the lane information extraction unit 120 may calculate a width of the lane, and the lane departure determination unit 140 may determine lane departure based on the width information of the vehicle and proximity to the left edge and right edge of the lane. Furthermore, the lane departure determination unit 140 may determine lane departure by additionally considering the inclination state of the vehicle detected by a gyro sensor and the like installed in the vehicle.

FIG. 2A to FIG. 2D are diagrams illustrating lane approaching and departure states of a vehicle. With reference to FIG. 2A to FIG. 2D, a process of determining lane proximity and lane departure states in the present disclosure will be described. The illustrated example shows a state in which the vehicle is positioned with a sufficient space from both sides of the lane, but this is only an example for helping the understanding of the present disclosure and is not an example for specifying the present disclosure.

Figure 2A:
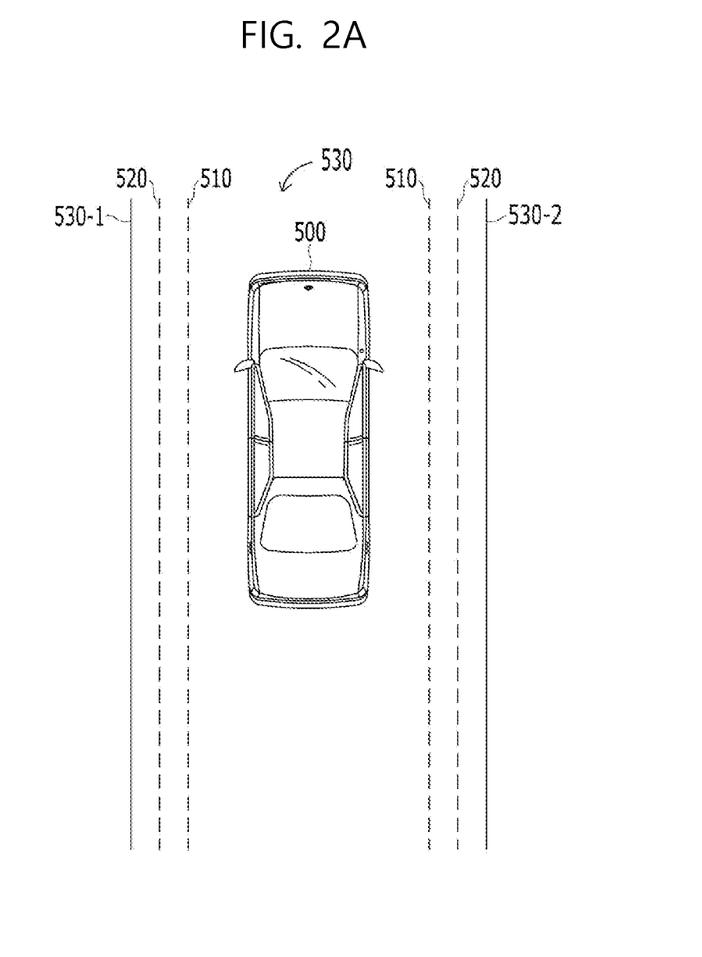
FIG. 2A to FIG. 2D are diagrams illustrating lane approaching and departure states of a vehicle.

FIG. 2A illustrates a state in which a vehicle 500 is traveling in a state of being located in the center of a lane 530 having a left edge 530-1 and a right edge 530-2. In such a case, no lane departure warning is generated.

Figure 2B:
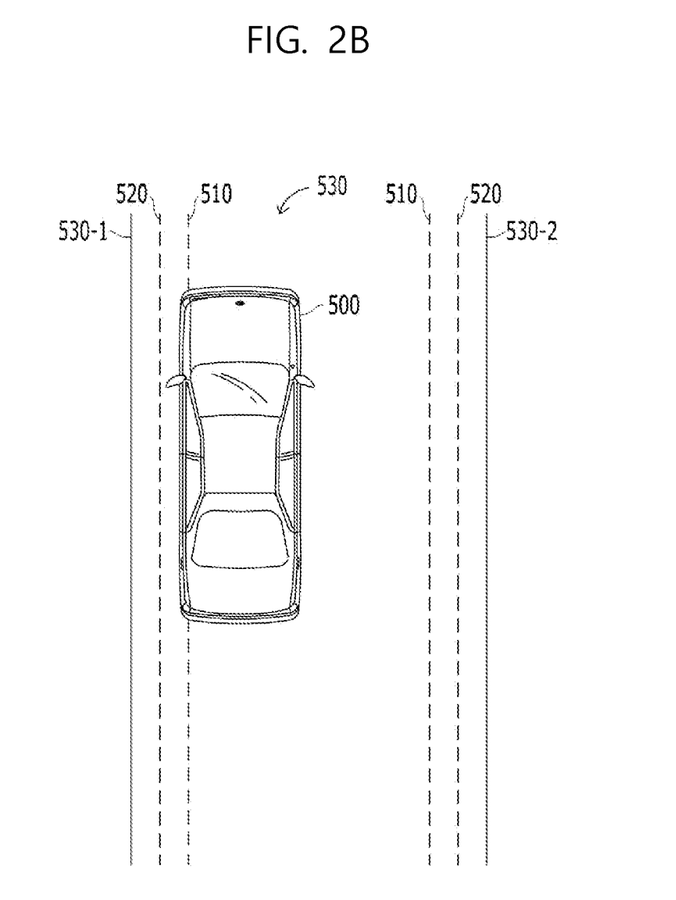

FIG. 2B illustrates a state in which the vehicle 500 has invaded a second proximity line 510. In the following embodiment, the state in which the vehicle 500 has invaded the second proximity line 510 will be described as being a state in which the vehicle has reached lane proximity 2. In the present disclosure, in the state in which the vehicle has reached the lane proximity 2, when a driver's forward looking state is very poor (that is, with a relaxed limitation on the forward looking state), a warning is generated. Accordingly, an early warning is generated before lane departure actually occurs, thereby alerting the driver.

Figure 2C:
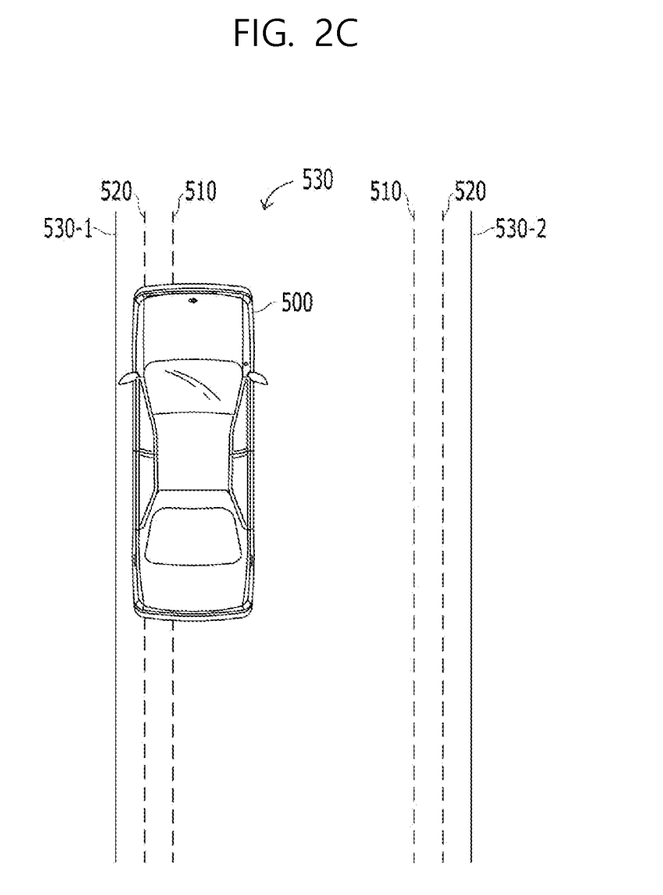

FIG. 2C illustrates a state in which the vehicle 500 has invaded a first proximity line 520. In the following embodiment, the state in which the vehicle 500 has invaded the first proximity line 520 will be described as being a state in which the vehicle has reached lane proximity 1. In the present disclosure, in the state in which the vehicle has reached the lane proximity 1, when the driver's forward looking state is poor (that is, with a relaxed limitation compared to the lane proximity 2), a warning is generated. Accordingly, an early warning can be generated just before lane departure may actually occur.

Figure 2D:
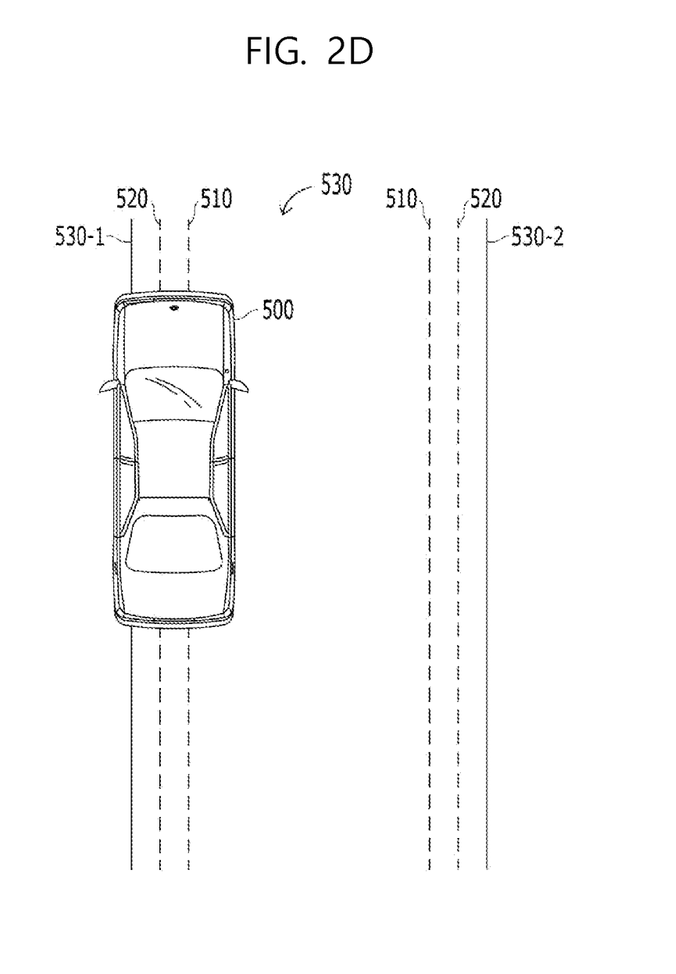

FIG. 2D illustrates a state in which the vehicle 500 has departed from the lane 530. In such a lane departure state, when the driver's forward looking state is insignificantly unstable (that is, with a very strict limitation), a warning is generated.

Referring back to FIG. 1, the driver recognition camera 210 is a camera installed inside the vehicle toward a driver, and is a means for photographing the face of the driver.

Figure 3A:
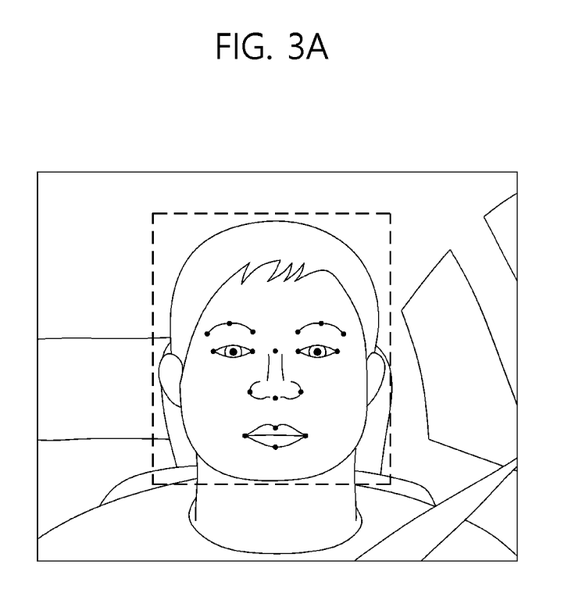
FIG. 3A and FIG. 3B are diagrams illustrating a normal state and an unrecognized state of a driver.
Figure 3B:
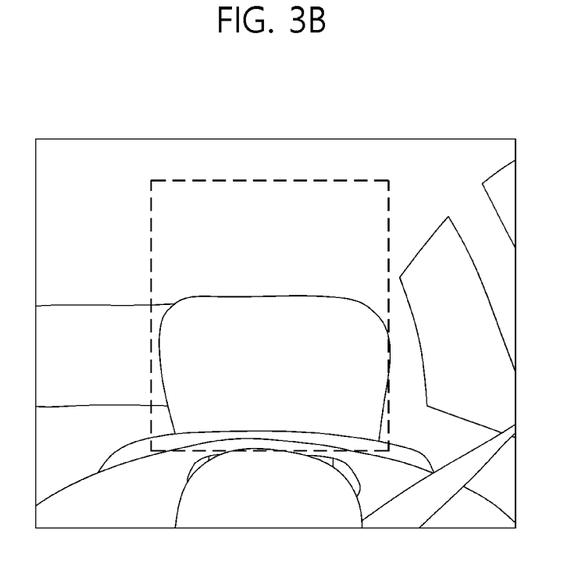
Figure 4A:
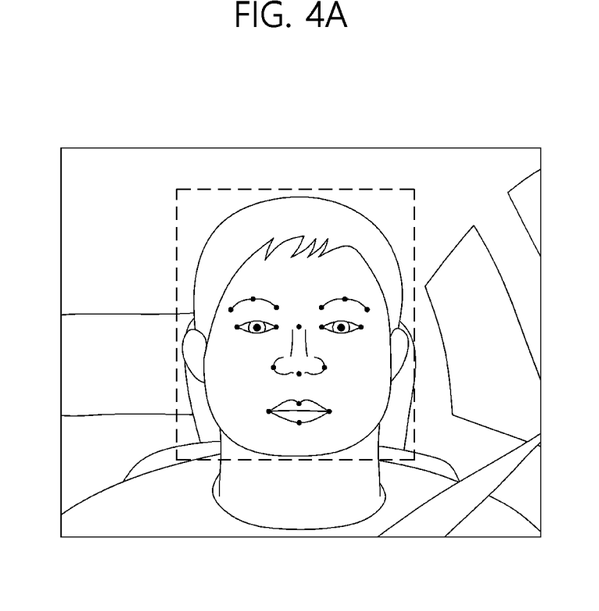
FIG. 4A and FIG. 4B are diagrams illustrating a normal state and a front distraction state of a driver.
Figure 4B:
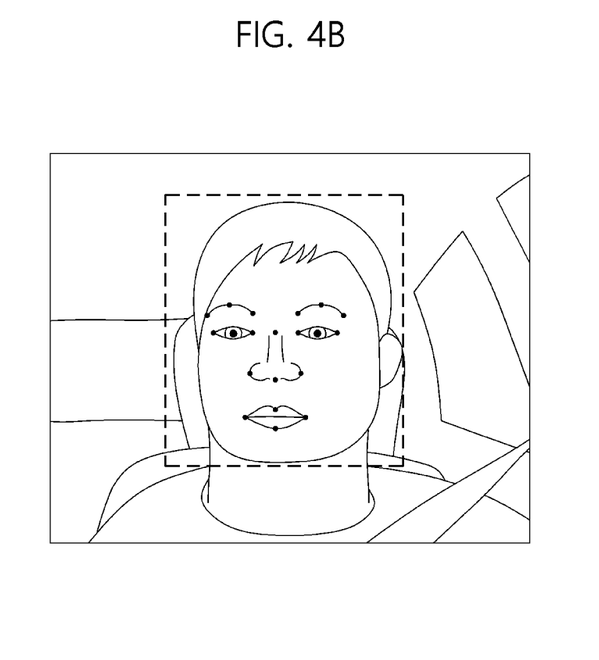
Figure 5A:
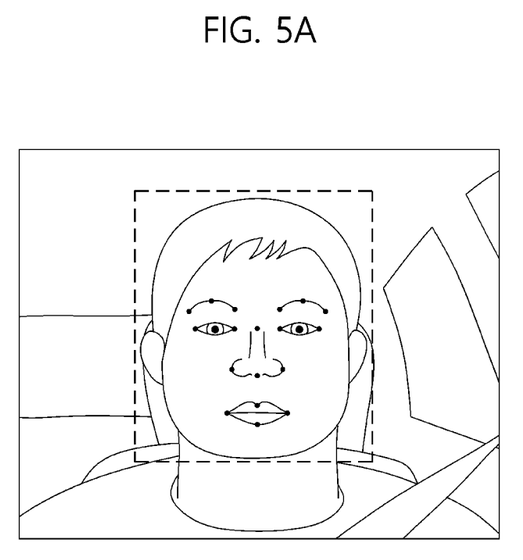
FIG. 5A and FIG. 5B are diagrams illustrating a normal state and a drowsy driving state of a driver.
Figure 5B:
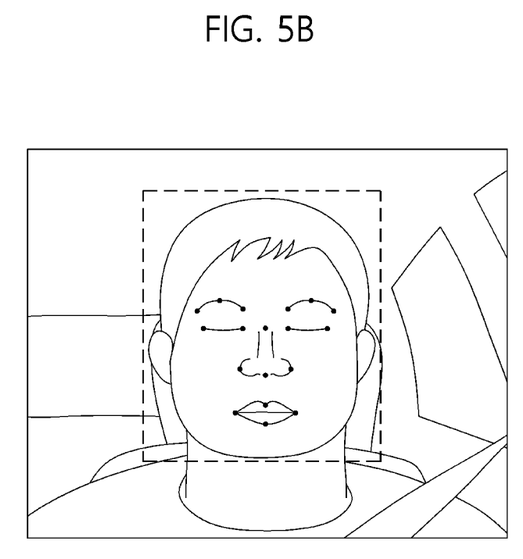

A driver facial feature point extraction unit 220 extracts the facial feature points of the driver from an image photographed by the driver recognition camera 210. As illustrated in FIG. 3 to FIG. 5, the facial feature points of the driver include position information of a face contour of the driver, position information of end points of each of both eyes located within the face contour, position information of a pupil located between the end points of each of both eyes, position information of a protruding start point and a protruding end point of a nose located within the face contour, and position information of upper and lower ends and left and right ends of lips located within the face contour.

A driver departure determination unit 230 is a means that determines whether the driver has departed from a driver's seat. For example, the driver departure determination unit 230 is a means that detects a case where the driver bows his/her head to pick up an object falling on the floor of the vehicle, and determines that the driver is not recognized when the position information of the face contour of the driver is changed to an allowable value or more.

FIG. 3A illustrates a normal state of a driver, whereas FIG. 3B illustrates a state in which the face contour of the driver and feature points within the face contour are not detected at a position where the face contour needs to be detected. FIG. 3B illustrates a state in which the face of the driver is not detected at all, in order to help the understanding of the present disclosure, but a state in which less than 50% of the face contour of the driver is detected or 30% or more of the facial feature points of the driver are not detected within the dotted line of FIG. 3B may be determined as the unrecognized state of the driver.

A front distraction determination unit 240 is a means that determines the front distraction state of the driver by using the facial feature points of the driver. In the present disclosure, the front distraction state is determined based on the face tilt of the driver, and is determined in a plurality of steps according to the face tilt of the driver.

The face tilt of the driver is measured from the degree by which any one of the position information of the end points of each of both eyes, the position information of the pupil, the position information of the protruding start point and the protruding end point of the nose, and the position information of the upper and lower ends and the left and right ends of the lips among the facial feature points of the driver has moved up, down, left, or right compared to a normal position centered on the front of the vehicle.

FIG. 4A illustrates a state in which the face tilt of the driver is 0☐, as the normal state of the driver. In contrast, FIG. 4B illustrates a state in which the face tilt is inclined at a predetermined angle (state in which the face of the driver is turned to the right).

In the following embodiment, a state in which the face tilt of the driver exceeds a first angle (for example, 15☐) will be referred to as a first front distraction state. Furthermore, a state in which the face tilt of the driver exceeds a second angle (for example, 30☐) will be referred to as a second front distraction state. A state in which the face tilt of the driver exceeds a third angle (for example, 40 ☐) will be referred to as a third front distraction state.

A drowsy driving determination unit 250 is a means that determines whether the driver is in a drowsy state. The drowsy driving state may be determined by determining whether a distance between the end points of each eye is increased from the position information of the end points of each eye. As another example, the drowsy driving state may be determined by determining whether the position information of the pupil is not detected, or an interval between the upper and lower end positions of the lips is increased over a predetermined interval (for example, a case where the driver yawns, and the like).

FIG. 5A illustrates the normal state of the driver, whereas FIG. 5B illustrates a state in which the driver is driving a vehicle while drowsy, and the drowsy driving determination unit 250 detects such a driver's drowsy state.

Figure 6:
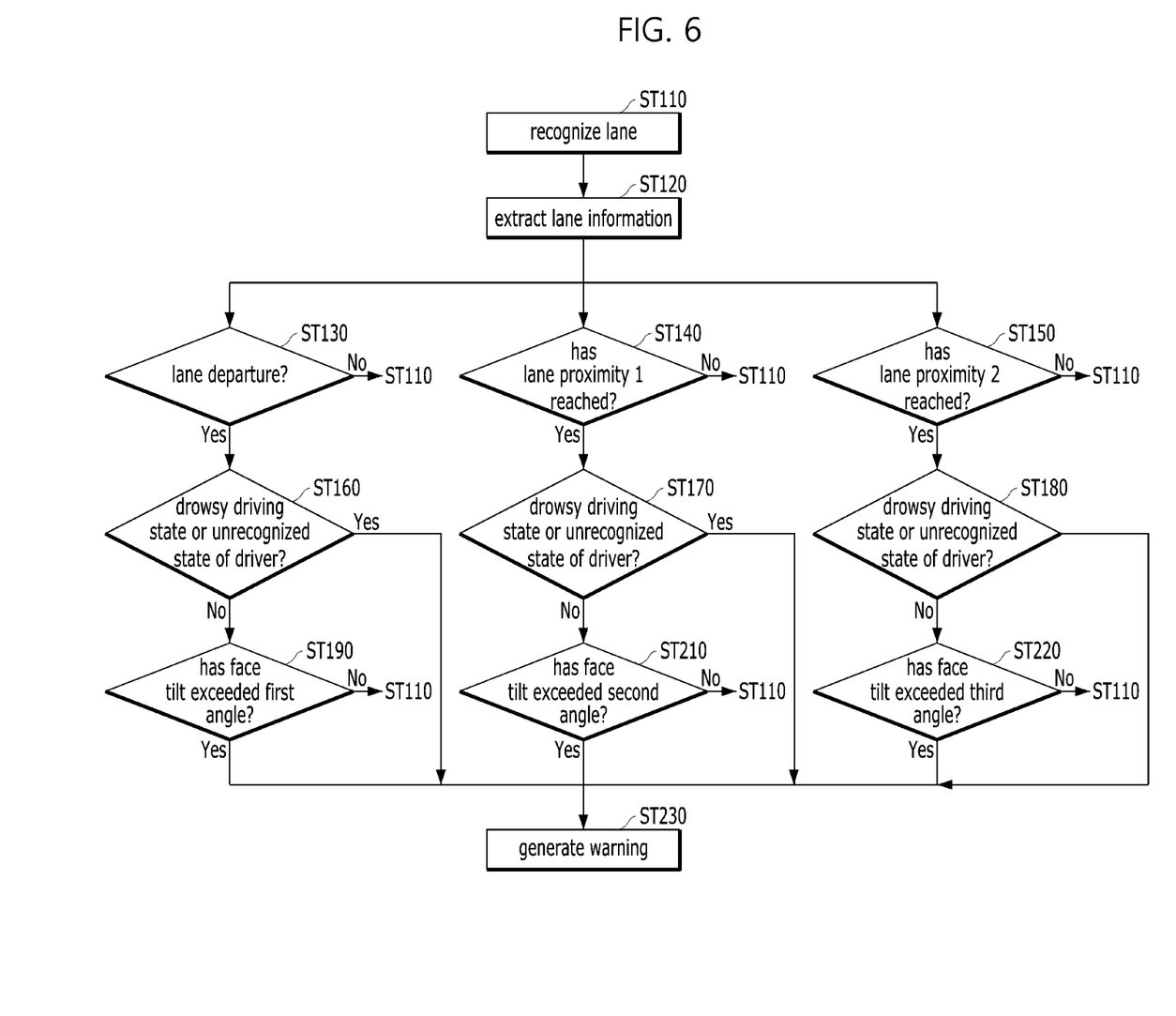
FIG. 6 is a flowchart illustrating the lane departure warning determination method using driver state monitoring according to the present disclosure.

FIG. 6 is a flowchart illustrating the lane departure warning determination method using driver state monitoring according to the present disclosure. With reference to FIG. 6, the lane departure warning determination method using driver state monitoring according to the present disclosure will be described as follows.

In step ST110, a process is started by recognizing a lane from an image photographed by the lane recognition camera 110 (ST110). Then, the lane information extraction unit 120 extracts lane information from the photographed image (ST120). In parallel with this operation, the driver facial feature point extraction unit 220 extracts the facial feature points of a driver from an image photographed by the driver recognition camera 210. Then, the driver departure determination unit 230 determines the unrecognized state of the driver, the front distraction determination unit 240 determines the first front distraction state to the third front distraction state described above, and the drowsy driving determination unit 250 determines the drowsy state of the driver.

It is determined whether a vehicle is in a lane departure state by using the extracted lane information (ST130), it is determined whether the vehicle has reached the lane proximity 1 (ST140), and it is determined whether the vehicle has reached the lane proximity 2 (ST150).

Even though the vehicle is in any one of the lane departure state, the lane proximity 1 state, and the lane proximity 2 state, when the drowsy driving state or the unrecognized state of the driver is detected (ST160, ST170, and ST180), a warning is generated (ST230). However, when the drowsy driving state or the unrecognized state of the driver is not detected, the process proceeds to subsequent steps ST190, ST210, and ST220.

In the present disclosure, different warning suppression criteria are provided according to the face tilt of the driver. First, it is determined in the lane departure state whether the face tilt has exceeded the first angle (ST190). When the face tilt is changed even slightly, the process proceeds to step ST230 to generate a warning. That is, in the lane departure state, the warning generation criterion is strictly applied.

When the vehicle has reached the lane proximity 1, it is determined whether the face tilt has exceeded the second angle (ST210), and when the determination result is 'Yes', a warning is generated (ST230). The second angle is an angle having a larger value than the first angle, and when the face tilt of the driver is more increased, that is, with a more relaxed criterion than the lane departure state, a warning is generated.

When the vehicle has reached the lane proximity 2, it is determined whether the face tilt has exceeded the third angle (ST220), and when the determination result is 'Yes', a warning is generated (ST230). The third angle is an angle having a larger value than the second angle, and when the face tilt of the driver is significantly increased, an early warning is generated, so that a warning can be generated before lane departure actually occurs.

The present disclosure can be variously modified without impairing the basic sprit thereof. That is, all the above embodiments should be construed to be illustrative and is not construed to be limitative. Accordingly, the protection scope of the present disclosure should be defined according to the accompanying claims rather than the above embodiments, and when elements defined in the accompanying claims are replaced with equivalents thereof, this should be deemed to fall within the scope of the present disclosure.

What is claimed is:

1. A lane departure warning determination method using driver state monitoring, comprising:
   (a) recognizing a lane around a vehicle from an image photographed by a lane recognition camera and extracting lane information;
   (b) extracting facial feature points of a driver from an image photographed by a driver recognition camera;
   (c) determining from the lane information whether the vehicle is in a lane departure state in which the vehicle has departed from the lane, a first lane proximity state in which the vehicle invades a first proximity line of a left edge of the lane or a right edge of the lane within a first predetermined distance, or a second lane proximity state in which the vehicle invades a second proximity line of the left edge of the lane or the right edge of the lane within a second predetermined distance;
   (d) when it is determined in step (c) that the vehicle is in the lane departure state, generating a warning when a face tilt of the driver exceeds a predetermined first angle centered on a front of the vehicle based on the facial feature points of the driver;
   (e) when it is determined in step (c) that the vehicle is in the first lane proximity state, generating a warning when the face tilt of the driver exceeds a second angle larger than the first angle centered on the front of the vehicle based on the facial feature points of the driver; and
   (f) when it is determined in step (c) that the vehicle is in the second lane proximity state, generating a warning when the face tilt of the driver exceeds a third angle larger than the second angle centered on the front of the vehicle.

2. The lane departure warning determination method using driver state monitoring according to claim 1, wherein the facial feature points of the driver include position information of a face contour of the driver, position information of end points of each of both eyes located within the face contour, position information of a pupil located between the end points of each of both eyes, position information of a protruding start point and a protruding end point of a nose located within the face contour, and position information of upper and lower ends and left and right ends of lips located within the face contour.

3. The lane departure warning determination method using driver state monitoring according to claim 2, wherein the face tilt of the driver is measured from a degree by which any one of the position information of the end points of each of both eyes, the position information of the pupil, the position information of the protruding start point and the protruding end point of the nose, and the position information of the upper and lower ends and the left and right ends of the lips has moved up, down, left, or right compared to a normal position centered on the front of the vehicle.

4. The lane departure warning determination method using driver state monitoring according to claim 3, wherein the first angle is selected to be in a range of 13° to 17°, and the second angle is selected to be in a range of 28° to 32°.

5. The lane departure warning determination method using driver state monitoring according to claim 2, further comprising:
generating a warning when a drowsy driving state of the driver or an unrecognized state of the driver is determined based on the facial feature points of the driver in a case where it is determined in step (c) that the vehicle is in one of the lane departure state, the first lane proximity state and the second lane proximity state.

6. The lane departure warning determination method using driver state monitoring according to claim 5, wherein the drowsy driving state is determined by determining whether a distance between the end points of each eye is increased from the position information of the end points of each eye, is determined by determining whether the position information of the pupil is not detected, or an interval between the upper and lower end positions of the lips is increased over a predetermined interval.

7. The lane departure warning determination method using driver state monitoring according to claim 5, wherein the unrecognized state of the driver is determined when the position information of the face contour of the driver is changed to an allowable value or more.

8. The lane departure warning determination method using driver state monitoring according to claim 3, further comprising:
generating a warning when a drowsy driving state of the driver or an unrecognized state of the driver is determined based on the facial feature points of the driver in a case where it is determined in step (c) that the vehicle is in the lane departure state or the lane approaching state.

9. The lane departure warning determination method using driver state monitoring according to claim 4, further comprising:
generating a warning when a drowsy driving state of the driver or an unrecognized state of the driver is determined based on the facial feature points of the driver in a case where it is determined in step (c) that the vehicle is in the lane departure state or the lane approaching state.

10. The lane departure warning determination method using driver state monitoring according to claim 8, wherein the drowsy driving state is determined by determining whether a distance between the end points of each eye is increased from the position information of the end points of each eye, is determined by determining whether the position information of the pupil is not detected, or an interval between the upper and lower end positions of the lips is increased over a predetermined interval.

11. The lane departure warning determination method using driver state monitoring according to claim 9, wherein the drowsy driving state is determined by determining whether a distance between the end points of each eye is increased from the position information of the end points of each eye, is determined by determining whether the position information of the pupil is not detected, or an interval between the upper and lower end positions of the lips is increased over a predetermined interval.

12. The lane departure warning determination method using driver state monitoring according to claim 8, wherein the unrecognized state of the driver is determined when the position information of the face contour of the driver is changed to an allowable value or more.

13. The lane departure warning determination method using driver state monitoring according to claim 9, wherein the unrecognized state of the driver is determined when the position information of the face contour of the driver is changed to an allowable value or more.

* * * * *